United States Patent
Patel et al.

(10) Patent No.: US 9,757,994 B2
(45) Date of Patent: Sep. 12, 2017

(54) SYSTEM AND METHOD FOR MONITORING A COMMUNICATIVE CONNECTION WITH A TRAILER

(71) Applicant: FORD GLOBAL TECHNOLOGIES, LLC, Dearborn, MI (US)

(72) Inventors: Dilip B. Patel, Novi, MI (US); Christopher Henderson, Belleville, MI (US); James Edwin Blatchford, Northville, MI (US); Stavros Dionyssopoulos, Grosse Ile, MI (US); James Edward Gregoire, Westland, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/811,374

(22) Filed: Jul. 28, 2015

(65) Prior Publication Data
US 2017/0028794 A1   Feb. 2, 2017

(51) Int. Cl.
| | | |
|---|---|---|
| G08B 21/00 | (2006.01) |
| B60C 23/02 | (2006.01) |
| B60D 1/58 | (2006.01) |
| B60C 23/00 | (2006.01) |
| B60C 23/04 | (2006.01) |

(52) U.S. Cl.
CPC ............ *B60C 23/02* (2013.01); *B60C 23/009* (2013.01); *B60C 23/0454* (2013.01); *B60C 23/0481* (2013.01); *B60D 1/58* (2013.01)

(58) Field of Classification Search
CPC .. C07C 11/18; C07C 7/04; C07C 7/11; C07C 7/10; B01D 2252/205; B01D 2256/24; B01D 2257/7022; B01D 2257/7027; B01D 53/1487
USPC .................................................. 340/431, 903
See application file for complete search history.

(56) References Cited

U.S. PATENT DOCUMENTS

| | | | |
|---|---|---|---|
| 5,488,352 A | 1/1996 | Jasper | |
| 7,463,139 B2 | 12/2008 | Burlak et al. | |
| 8,013,759 B1 * | 9/2011 | Aid .......................... | B60D 1/30 |
| | | | 303/123 |
| 8,068,019 B2 | 11/2011 | Bennie et al. | |
| 8,098,145 B2 | 1/2012 | Ancuta et al. | |
| 2001/0002813 A1 * | 6/2001 | Seki ...................... | H04W 8/245 |
| | | | 340/5.6 |
| 2003/0090085 A1 | 5/2003 | Seksaria et al. | |
| 2005/0093683 A1 | 5/2005 | Wee et al. | |
| 2010/0271189 A1 | 10/2010 | Miller et al. | |
| 2012/0105222 A1 | 5/2012 | Miller et al. | |
| 2013/0193669 A1 * | 8/2013 | Glazner ................. | B60D 1/015 |
| | | | 280/421 |

(Continued)

FOREIGN PATENT DOCUMENTS

| | | |
|---|---|---|
| JP | H06-199192 A | 7/1994 |
| WO | WO 2014/037540 A1 | 3/2014 |

*Primary Examiner* — Ojiako Nwugo
(74) *Attorney, Agent, or Firm* — Jones Robb, PLLC; Raymond L. Coppiellie

(57) ABSTRACT

Systems and methods are described for monitoring a communicative connection with a trailer. Messages transmitted between a tire pressure management module of a trailer and a controller of a vehicle may be monitored. A notification may be triggered when the controller has not received a message from the tire pressure management module during at least a predetermined period of time.

20 Claims, 3 Drawing Sheets

(56) References Cited

U.S. PATENT DOCUMENTS

2014/0236420 A1 8/2014 Bromback et al.
2016/0207367 A1* 7/2016 Zula ........................ B60D 1/62

* cited by examiner

SYSTEM AND METHOD FOR MONITORING A COMMUNICATIVE CONNECTION WITH A TRAILER

RELATED APPLICATION

This application is related to U.S. patent application. Ser. No. 14/811,433, filed May 9, 2017, the entire content of which is incorporated by reference herein.

TECHNICAL FIELD

The present disclosure relates generally to a method and system for monitoring a communicative connection with a trailer and to a vehicle for carrying out the method of the disclosure.

INTRODUCTION

Tire pressure management systems (TPMS) have become increasingly prevalent in modern vehicles. However, TPMS systems that manage a trailer, or some other wheeled structure attached to a vehicle, may face unique complexities. For example, sensors may be located at each wheel of the trailer and may further leverage wireless transmission (e.g., RF transmissions) in order to communicate with a TPMS module. When such a module is located on the vehicle, the transmissions may encounter interference, signal degradation, and other communication issues. Moreover, when such a module is located on the trailer, the connection between the module and the vehicle may experience potential faults. Accordingly, a design that mitigates the communication issues presented by a trailer configuration will enhance the effectiveness of a TPMS system.

SUMMARY

In accordance with various exemplary embodiments, the present disclosure provides systems and methods for monitoring a communicative connection with a trailer. Messages transmitted between a tire pressure management module of a trailer and a controller of a vehicle may be monitored. A notification may be triggered when the controller has not received a message from the tire pressure management module during at least a predetermined period of time.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages will be apparent from the following detailed description of embodiments consistent therewith, which description should be considered with reference to the accompanying drawings, wherein.

Figure 1:
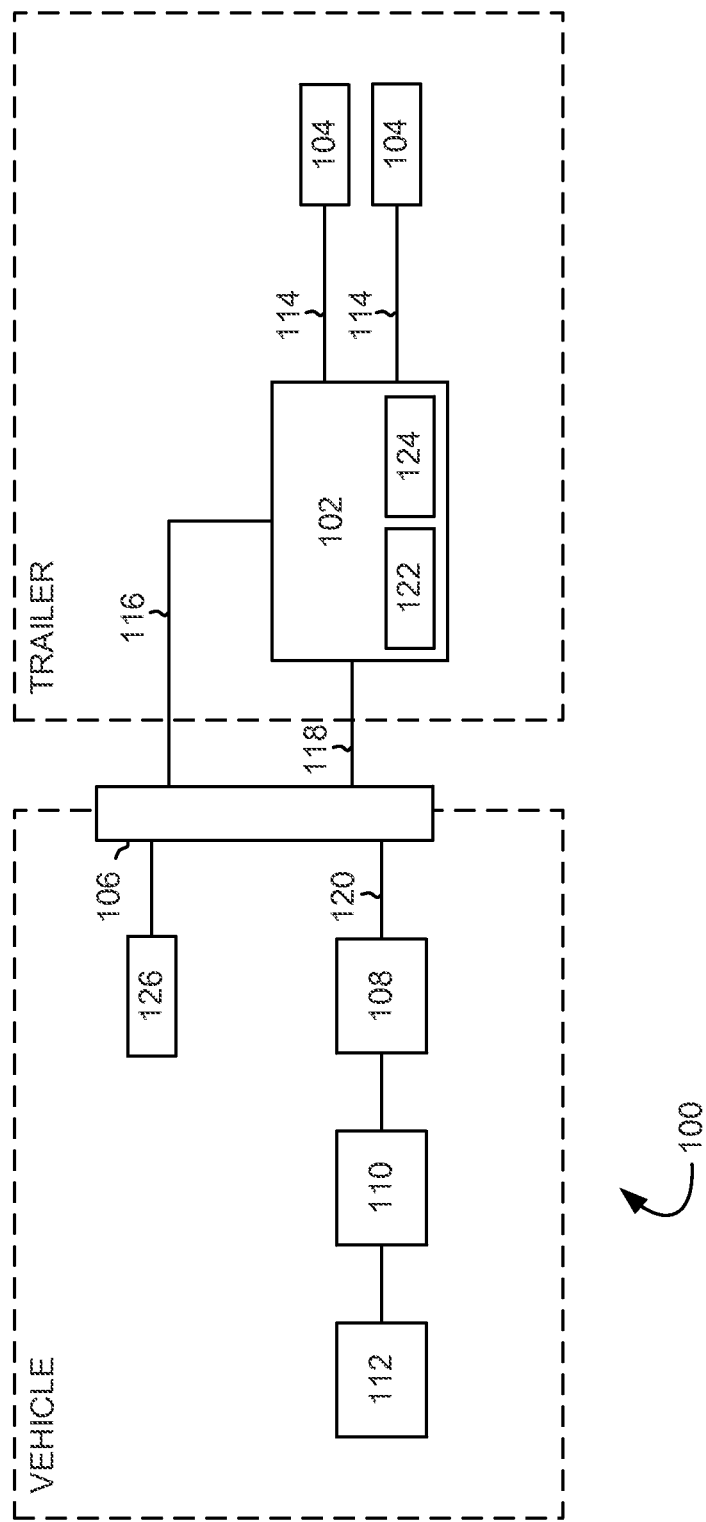
FIG. 1 is a schematic illustration of an system for managing tire pressure for a trailer in accordance with the present teachings.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents. In the drawings and the description, similar elements are provided with similar reference numerals. It is to be noted that the features explained individually in the description can be mutually combined in any technically expedient manner and disclose additional embodiments of the present disclosure.

The disclosure provides a method and system for monitoring a communicative connection with a trailer. In accordance with the present teachings, an exemplary embodiment may include a controller to be used in a vehicle and a tire pressure management system (TPMS) module to be used in a trailer to be connected to the vehicle.

The controller may comprise a synchronous data link control (SDLC) controller that manages data communication on a vehicle network. For example, the vehicle network may implement controller area network (CAN) protocol, a local interconnect network (LIN) protocol, or may be any other suitable vehicle network. Data may be communicated between various vehicle network devices in the form of messages (e.g., CAN messages) over the vehicle bus.

The TPMS module may comprise a computing device to be mounted on the trailer that communicates with a plurality of tire sensors associated with tires of the trailer. For example, each sensor may comprise identifying information, such as a sensor ID, stored at the TPMS module. The sensors may sense a tire pressure for the tires of the trailer and transmit this information to the TPMS module. As will be understood by those of skill in the art, the TPMS module may be retrofitted to existing trailers or sold as part of the infrastructure of new trailers.

In accordance with the present teachings, in an exemplary embodiment the TPMS module may transmit one or more messages (e.g., CAN messages) to the controller indicating the tire pressure for each tire mounted (or rotatably connected) to the trailer. For example, the TPMS module and controller may be operatively connected via a tow connector that links the vehicle to the trailer.

The described TPMS configuration may provide a number of advantages over traditional architectures. For example, the TPMS module may be mounted on the trailer itself, and the trailer may accordingly store sensor IDs for each of the tire pressure sensors. Further, the TPMS module may communicate with the vehicle using a wired connection via the tow connector, and may also implement a robust messaging protocol (e.g., CAN, LIN, or any other suitable protocol). This configuration may provide greater reliability when multiple trailers and vehicles are connected to one another. Because the sensor IDs are stored at the TPMS module on the trailer, the trailer may be switched between vehicles with minimal vehicle and/or trailer specific configuration required. In addition, use of the messaging protocol and/or wired communication medium may enable greater security for communications between the vehicle and the TPMS module.

In exemplary embodiments, this greater security may also include enabling the TPMS module to be located in a secure location on the trailer. Because exemplary embodiments utilize wired, rather than wireless, transmissions between the vehicle and trailer, it may not be necessary to ensure the module is located at a location conducive to wireless communication with the vehicle (e.g., controller of the vehicle). This enables greater flexibility for module location, and ultimately allows the module to be stored in a more secure location, such as an enclosed location inaccessible to individuals outside the trailer.

The described TPMS configuration may additionally encounter communication issues with the controller of the vehicle. Because the TPMS module is located on the trailer in exemplary embodiments, the communication between the module and the controller of the vehicle may encounter disruptions. In exemplary embodiments, the communication between the TPMS module and the controller may be monitored such that a fault may be detected when the TPMS module has not communicated with the controller with a predetermined period of time. For example, messages from the TPMS module to the vehicle controller may be monitored, and an indicator (e.g., fault indicator) may be triggered when a message has not been detected within a predetermined period of time.

FIG. 1 depicts a vehicle and trailer that may be placed in communication with one another using the method and system of the present disclosure. In accordance with the present teachings, in an exemplary embodiment a trailer may be any wheeled structure that comprises an axle and may include two, four, six, or any other suitable number of wheels. The system 100 may include TPMS module 102, located in/on the trailer, and sensors 104 associated with wheels of the trailer. TPMS module 102 may be a computing device including software for communicating with sensors 104 via wireless transmissions and communicating with controller 108 of a vehicle (to be connected to the trailer) using messages formatted according to a network protocol (e.g., CAN, LIN, or any other suitable protocol). TPMS module 102 also may include an antenna 122 capable of receiving and/or transmitting RF transmissions and a network port 124 capable of transmitting messages over a wired transmission medium. In an exemplary embodiment, sensors 104 may sense tire pressure for the tires mounted (rotatably connected) to the trailer and transmit the tire pressure information to TPMS module 102 over wireless communication links 114.

A tow connector 106 may connect the vehicle to the trailer. For example, tow connector 106 may comprise a plurality of connector pins and/or electrical connection points (not shown) that operatively couple the vehicle to the trailer. Other suitable connector mechanisms may be used, as will be understood by those of skill in the art. At the vehicle, tow connector 106 may connect to a power source 126 and vehicle network bus 120. At the trailer, tow connector 106 may connect to TPMS module 102 such that module 102 receives power from the vehicle over a power link 116 and is communicatively coupled to vehicle network bus 120 over a communication link 118.

The vehicle may include a controller 108, a body control module (BCM) 110, an instrument panel cluster (IPC) 112, and a vehicle network bus 120. Controller 108 may comprise an SDLC controller that manages communications over vehicle network bus 120. For example, vehicle network bus 120 may communicatively connect vehicle computing devices such that data may be exchanged between these devices. Vehicle network bus 120 may implement a protocol, such as CAN, LIN, or any other suitable protocol. BCM 110 may mange various electronic accessories of the vehicle, including power windows, air conditioning, central locking, vibration of vehicle instruments, and other suitable electronic accessory systems. IPC 112 may comprise an instrument panel that displays various vehicular information to a user of the vehicle, such as for example vehicle speed, gas quantity, warning indicators, emergency indicators, and any other suitable information. IPC 112 may include analog instruments and digital displays.

In exemplary embodiments, one of more of BCM 110 and IPC 112 may be used to communicate an indicator and/or warning to a user of the vehicle based on a potential fault detected for the TPMS system. For example, an indicator may be displayed on a digital display or an indicator light be triggered at IPC 112. In another example, the BCM 110 may trigger a haptic warning, such as a vibration of the steering wheel, or may trigger any other suitable indicator and/or warning.

TPMS module 102, controller 108, BCM 110, and IPC 112 may form one part of the hardware of a control system, and may be one or more microprocessor based devices that include a central processing unit (CPU) for processing incoming signals from known source(s). These computing devices may be provided with volatile memory units, such as a RAM and/or ROM that function along with associated input and output buses, and may also be optionally configured as an application specific integrated circuit, or may be formed through other logic devices that are well known to the skilled in the art. The computing devices either may be formed as a portion of an existing electronic control unit, or may be configured as a stand-alone entity.

In accordance with the present teachings, in an exemplary embodiment TPMS module 102 may be configured such that sensors 104 may communicate with module 102 to relay tire pressure information. For example, TPMS module 102 may be trained such that identifying information for each of sensors 104 is stored at the module. Moreover, TPMS module 102 may receive a pressure criteria (e.g., target tire pressure) for each tire associated with each of sensors 104. In an exemplary embodiment, a user may interact with IPS 112 or any other suitable data input hardware of the vehicle to provide data input to the TPMS module 102.

In accordance with the present teachings, in an exemplary embodiment TPMS module 102 may receive tire pressure information from learned sensors 104 over, for example, wireless communication links 114. TPMS module 102 may then send one or more messages (e.g., CAN messages) that indicate the tire pressure for sensors 104 over communication link 118. In an embodiment, communication link 118 may comprise a wired communication link. The one or more messages may be routed over vehicle communication bus 120 to controller 108.

Figure 2:
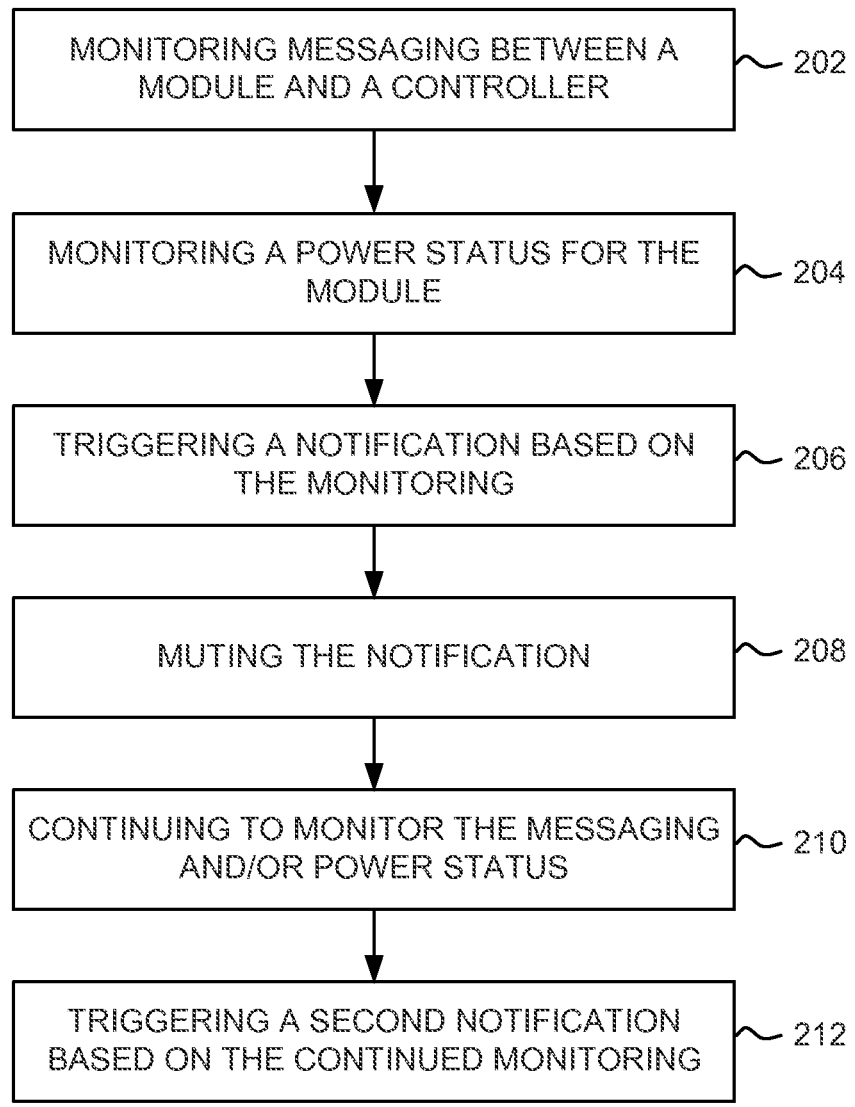
FIG. 2 is a flowchart of an exemplary method for monitoring a communicative connection with a trailer in accordance with the present teachings.

FIG. 2 illustrates a flowchart for monitoring a communicative connection with a trailer in accordance with an exemplary embodiment of the disclosure. For example, as illustrated in FIG. 1, a trailer may be connected to a vehicle's controller via a connector (e.g., tow connector), and the controller may monitor the connection in order to detect potential faults.

In accordance with the present teachings, an exemplary embodiment of the method begins at step 202, where messages between TPMS module 102 and vehicle controller 108 may be monitored. In exemplary embodiments, TPMS module 102 may receive tire pressure information for tires associated with each of sensors 104. In an embodiment, TPMS module 102 may have been previously configured to manage tire pressure for the tires mounted (rotatably connected) to the trailer.

In an exemplary embodiment, TPMS module 102 may transmit one or more messages over communication link 118 that indicate the sensed tire pressure for each of the tires associated with sensors 104. TPMS module 102 may be operatively connected to vehicle communication bus 120 via tow connector 106, and the messages may be routed to controller 108. Messages may be formatted in accordance with a protocol implemented by the vehicle communication bus 120 (e.g., CAN, LIN, and the like). In various exemplary embodiments, any other suitable messages may be received from TPMS module 102 to controller 108.

In an exemplary embodiment, the connection between TPMS module 102 and controller 108 (e.g., vehicle bus 120 and/or tow connector 106) may be monitored such that messages received from TPMS module 102 are monitored. The messages may comprise CAN messages, or any other suitable messages, and may include indications of sensed tire pressure from sensors 104, or may include any other suitable information. In an exemplary embodiment, a number of messages received from TPMS module 102 over a predetermined period of time may be monitored.

At step 204, a power status for TPMS module 102 may be monitored. For example, TPMS module 102 may be powered by a power source 126 located on the vehicle via tow connector 106 and power link 116. Controller 108 may monitor a power status for TPMS module 102 based on feedback from tow connector 106. For example, the tow connector may transmit a signal to controller 108 that indicates the power status of devices powered by power source 126, including TPMS module 102. The power status may indicate that TPMS module 102 is receiving power, is not receiving power, or may indicate any other suitable power status.

At step 206, a notification may be triggered based on the monitoring. For example, a notification may be triggered when it is detected that controller 108 has not received a message from TPMS module 102 for at least a first predetermined period of time. In an exemplary embodiment, the first predetermined period of time may comprise an interval of time (e.g., minutes, hours, and the like) or a period of time defined by events (e.g., one or more key cycles). A key cycle may comprise a sequence of events including inserting the key into an ignition of the vehicle and performing an engine ignition, or may comprise any other key cycle sequence.

In an exemplary embodiment, the notification may be triggered based on at least one message having been received from TPMS module 102 at controller 108 during a second predetermined period of time, the second predetermined period of time being longer than the first predetermined period of time. For example, a message having been received from TPMS module 102 at controller 108 during a second predetermined period of time may indicate a functioning TPMS system for the trailer. Accordingly, if it is detected that controller 108 has not received a message from TPMS module 102 during at least the first predetermined period of time, and that at least one message has been received from TPMS module 102 at controller 108 during the second predetermined period of time, it may be determined that a previously functioning TPMS system may be experiencing a fault, such as a communication fault. In an exemplary embodiment, the second predetermined period of time may comprise an interval of time (e.g., minutes, hours, and the like) or a period of time defined by events (e.g., one or more key cycles).

In an exemplary embodiment, a notification may be triggered when it is detected that controller 108 has not received a message from TPMS module 102 for at least the first predetermined period of time and that the power status of TPMS module 102 indicates that the module is not powered. For example, controller 108 may monitor the power status of TPMS module 102, and may receive signals that indicate if TPMS module 102 is receiving power from power source 126.

The notification may be triggered when the monitored power status of TPMS module 102 indicates that the module was powered at some point over a second predetermined period of time. For example, the monitored power status of TPMS module 102 indicating that the module was powered at some point over a second predetermined period of time may further indicate a functioning TPMS system for the trailer. Accordingly, if it is detected that the power status of TPMS module 102 indicates that the module is not powered, and that the monitored power status of TPMS module 102 indicates that the module was powered at some point during the second predetermined period of time, it may be determined that a previously functioning TPMS system may be experiencing a fault, such as a power fault. In an exemplary embodiment, the second predetermined period of time may comprise an interval of time (e.g., minutes, hours, and the like) or a period of time defined by events (e.g., one or more key cycles).

In exemplary embodiments, a notification may be triggered when a number of monitored messages received from TPMS module 102 over a predetermined period of time does not meet a threshold. For example, monitoring messages received from TPMS module 102 may further comprise monitoring a number of messages from the module. In some instances, a number of messages may be expected, for instance if TPMS module 102 is scheduled to transmit messages based on a period of time and/or number of tire revolutions. A threshold may be set based on the expected number of messages over a predetermined period of time. If the number of monitored messages fails to meet a threshold, it may indicate a loose connection such that some of the messages transmitted from TPMS module 102 are not received. Thus, a notification may be triggered when a monitored number of messages fails to meet a threshold.

In exemplary embodiments, one of more of BCM 110 and IPC 112 may be used to communicate a notification, such as an indicator and/or warning, to an operator of the vehicle based on the monitoring. For example, an indicator may be displayed on a digital display or an indicator light may be triggered at IPC 112. In another example, the BCM 110 may trigger a haptic warning, such as a vibration of the steering wheel, or may trigger any other suitable indicator and/or warning. In an exemplary embodiment, an indicator or warning may comprise denying an operator the ability to drive the vehicle, for example, until the operator of the vehicle provides feedback on the indicator or warning. For example, the operator may dismiss or mute the indicator or warning if it is deemed that the vehicle is safe to drive (e.g., if the user knows that the TPMS indicator or warning is not a significant issue). Various embodiments may implement other notifications without deviating from the scope of the disclosure.

At step 208, controller 108 may mute or turn off the notification after a minimum period of time. For example, after the notification has been displayed or presented over a minimum period of time (e.g., second, minutes, hours, and the like), the notification may be muted or turned off. Muting or turning off the notification after a minimum period of time may appropriately notify the operator of the vehicle about the potential TPMS fault without distracting or annoying the operator.

At step 210, the messaging and/or power status may continue to be monitored. For example, the connection between TPMS module 102 and controller 108 (e.g., vehicle bus 120 and/or tow connector 106) may be continue to be monitored such that messages received from TPMS module 102 are monitored. In addition, the power status of TPMS module 102 may continue to be monitored.

At step 212, a second notification may be triggered based on the continued monitoring. For example, a second notification may be triggered when it is detected that controller 108 has not received a message from TPMS module 102 for at least a predetermined period of time since muting or turning off the initial notification. In another example, a second notification may be triggered when it is detected that controller 108 has not received a message from TPMS module 102 for at least a predetermined period of time since muting or turning off the initial notification and the power status of TPMS module 102 indicates that the module is not powered. The predetermined period of time since muting or turning off the initial notification may comprise an interval of time (e.g., minutes, hours, and the like) or a period of time defined by events (e.g., one or more key cycles). The continued monitoring and second triggering may be similar to other embodiments described in the disclosure.

In exemplary embodiments, the second notification may notify the operator of the vehicle that the TPMS system is still experiencing a potential fault. In an exemplary embodiment, the second notification may comprise denying the operator the ability to drive the vehicle, for example, until the operator of the vehicle provides feedback on notification. For example, the operator may dismiss or mute the notification if it is deemed that the vehicle is safe to drive (e.g., if the user knows that the TPMS notification is not a significant issue). In an exemplary embodiment, the initial notification may comprise a passive notification (e.g., an indicator light or message display) while the second notification includes denying the operator the ability to drive the vehicle, as described. Accordingly, the second notification may require greater attention from the operator of the vehicle.

Figure 3:
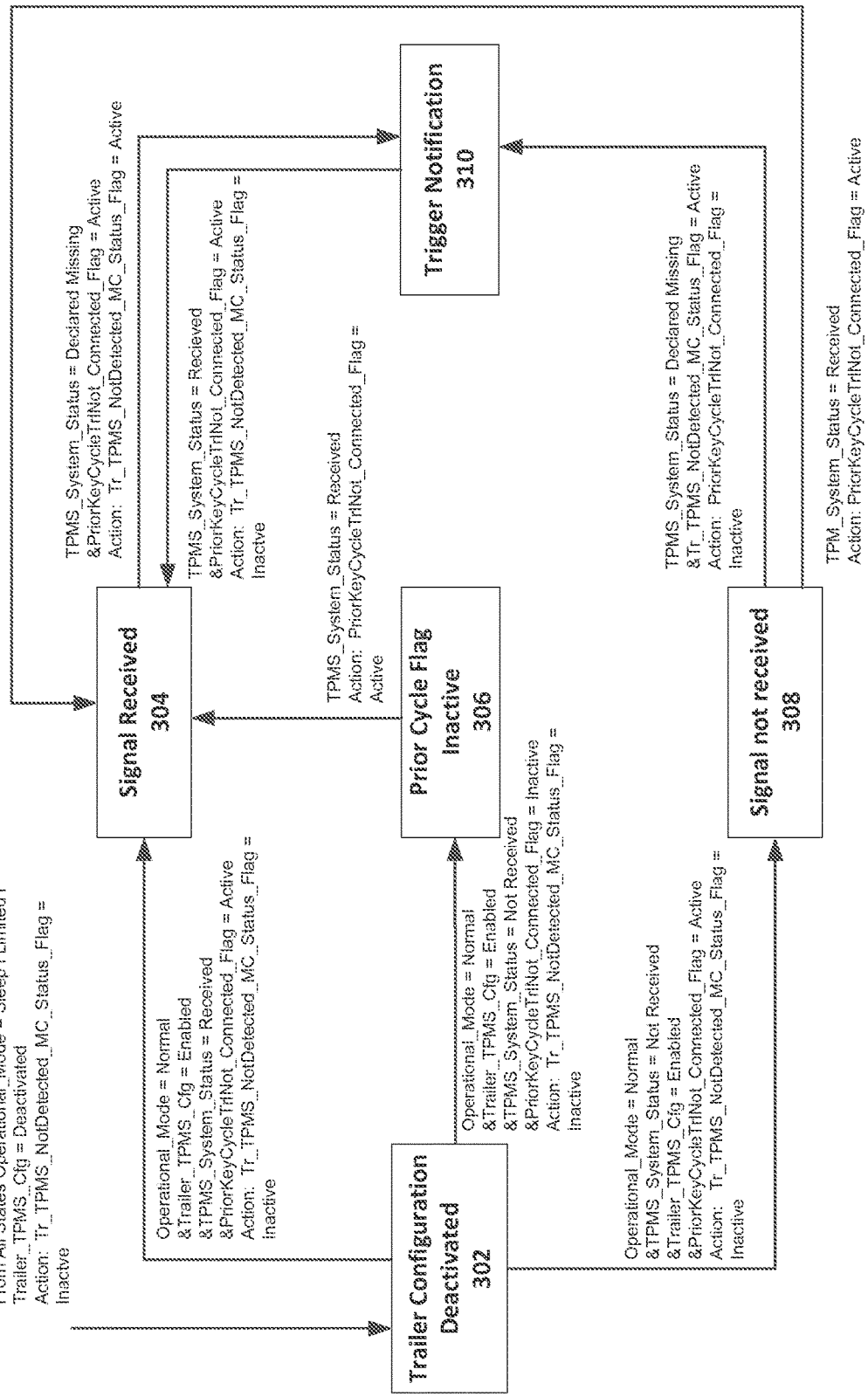
FIG. 3 is a flowchart of an exemplary method for triggering a notification in accordance with the present teachings.

FIG. 3 illustrates a flowchart for triggering a notification in accordance with an exemplary embodiment of the disclosure. For example, as illustrated in FIG. 1, a trailer may be connected to a vehicle's controller via a connector (e.g., tow connector), and the controller may monitor the connection in order to detect potential faults and subsequently trigger a notification.

In accordance with the present teachings, exemplary embodiments may utilize a plurality of flags and/or status indicators in order to trigger a notification. For example, an operational mode status indicator may indicate the operational mode of the vehicle, such as normal operation (e.g., vehicle ignition on and/or key moved to ignition state) or sleep/limited operation (e.g., vehicle ignition off and/or key moved to ignition off). A Trailer_TPMS_Cfg flag may indicate whether the TPMS system for an attached trailer is enabled or disabled. A TPMS_System_Status flag may indicate whether a signal (e.g., communication signal and/or power signal) has been received from a TPMS module (e.g., TPMS module 102). A Tr_TPMS_NotDetected_MC_Status_Flag may indicate that conditions have been met such that a warning should be triggered when the flag is active and conditions have been met to trigger a warning when the flag is inactive. A PriorKeyCycleTrlNot_Connected_Flag may indicate whether a signal was previously received from a TPMS module on a trailer (e.g., TPMS module 102). When the flag is active, a signal has been previously received (either in the current key cycle or a previous key cycle), and when the flag is inactive, a signal has not been previously received (either in the current key cycle or a previous key cycle). The PriorKeyCycleTrlNot_Connected_Flag may be persistent through one or more key cycles.

In accordance with the present teachings, an exemplary embodiment of the method begins at step 302, where the TPMS trailer system is deactivated. For example, the vehicle may be powered off or may be in some other state where no communication takes place between TPMS module 102 and controller 108. Once the TPMS trailer system is enabled, for instance when vehicle ignition takes place, the flowchart of FIG. 3 may progress to one of steps 304, 306, or 308.

If a signal is received from TPMS module 102, the method/process may proceed to step 304. For example if the Operational_Mode status is normal, the Trailer_TPMS_Cfg status is enabled, the TPMS_System_Status is received, and the PriorKeyCycleTrlNot_Connected_Flag is active, the method may proceed to step 304. In an exemplary embodiment, if messages are received at controller 108 from TPMS module 102 and/or if the power status of TPMS module 102 indicates that the module is receiving power, the method may proceed to step 304. Additionally, the Tr_TPMS_NotDetected_MC_Status_Flag may be set to inactive since the conditions for triggering a notification are not met.

In an exemplary embodiment, if a signal continues to be received from TPMS module 102 at step 304 (e.g., a signal is consistently received within a predetermined period of time) no notification is triggered and the method may later return to step 302 when the TPMS trailer system is again deactivated (e.g., when the vehicle is shut off). If a signal is not received from TPMS module at step 304 (e.g., a signal is not received within a predetermined period of time), the method may progress to step 310. For example, if the TPMS_System_Status is declared missing (e.g., because a signal was not received within a predetermined time period), and the PriorKeyCycleTrlNot_Connected_Flag is active, the Tr_TPMS_NotDetected_MC_Status_Flag may be set to active and a notification may be triggered at step 310. Step 310 will be further described below.

Returning to step 302, when the Operational_Mode is switched to normal (e.g., when the vehicle is turned on), if a signal is not received from TPMS module 102, the method may proceed to one of steps 306 or 308. If the PriorKeyCycleTrlNot_Connected_Flag is inactive, thus indicating that a signal from the TPMS module was not previously received, the method may proceed to step 306. For example, if the Operational_Mode status is normal, the Trailer_TPMS_Cfg status is enabled, the TPMS_System_Status is not received, and the PriorKeyCycleTrlNot_Connected_Flag is inactive, the method may proceed to step 306.

In an exemplary embodiment, if a signal is not received from TPMS module 102 at step 306, no notification is triggered and the method may later return to step 302 when the TPMS trailer system is again deactivated (e.g., when the vehicle is shut off). If a signal is received from TPMS module 102, the method may proceed from step 306 to step 304. For example, if the TPMS_System_Status is received, the method may proceed to step 306 and the PriorKeyCycleTrlNot_Connected_Flag may be set to active.

Returning to step 302, when the Operational_Mode is switched to normal (e.g., when the vehicle is turned on), if a signal is not received from TPMS module 102 and the PriorKeyCycleTrlNot_Connected_Flag is active, thus indicating that a signal from TPMS module 102 was previously received, the method may proceed to step 308. For example, if the Operational_Mode status is normal, the Trailer_TPMS_Cfg status is enabled, the TPMS_System_Status is not received, and the PriorKeyCycleTrlNot_Connected_Flag is active, the method may proceed to step 308.

In an exemplary embodiment, the connection between TPMS module 102 and controller 108 may be monitored for a period of time (e.g., first predetermined period of time) at step 308. If, while monitoring, a signal is received from TPMS module 102, the method may proceed to step 304. For example, if the TPMS_System_Status is received, the method may proceed to step 304 and may set the PriorKeyCycleTrlNot_Connected_Flag to active. If a signal is not received from TPMS module at step 308 (e.g., a signal is not received within a predetermined period of time), the method may progress to step 310. For example, if the TPMS_System_Status is declared missing (e.g., because a signal was not received within a predetermined time period), and the Tr_TPMS_NotDetected_MC_Status_Flag is active, a notification may be triggered at step 310. In addition, the PriorKeyCycleTrlNot_Connected_Flag may be set to inactive since no signal was received from TPMS module 102 during the key cycle.

In an exemplary embodiment, at step 310, a notification may be triggered. The notification may comprise any notification consistent with the teachings of this disclosure or any other suitable notification. If a notification is being presented (e.g., at step 308) and a signal from TPMS module 102 is received, the notification may be muted or turned off and the method may progress to step 304. For example, if the TPMS_System_Status is received and the PriorKeyCycleTrlNot_Connected_Flag is active, the method may proceed to step 304 and may set the Tr_TPMS_NotDetected_MC_Status_Flag to inactive.

In an exemplary embodiment, at any of steps 302, 306, and 308, the method may progress to step 304 if a signal is received from TPMS module 102. The method may progress from any of steps 304, 306, 308, and 310 to step 302 when the TPMS trailer system is deactivated (e.g., when the vehicle is turned off), and the Tr_TPMS_NotDetected_MC_Status_Flag may be set to inactive. Accordingly, a notification may be triggered based on the steps illustrated in FIG. 3.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices. Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices.

While the present disclosure has been disclosed in terms of exemplary embodiments in order to facilitate better understanding of the present disclosure, it should be appreciated that the present disclosure can be embodied in various ways without departing from the principle of the disclosure. Therefore, the present disclosure should be understood to include all possible embodiments which can be embodied without departing from the principle of the disclosure set out in the appended claims.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. Other embodiments of the disclosure will be apparent to those skilled in the art from consideration of the specification and practice of the disclosure disclosed herein. It is intended that the specification and embodiment described herein be considered as exemplary only.

What is claimed is:

1. A method for monitoring a communicative connection with a trailer, comprising:
    monitoring messages transmitted between a tire pressure management module of a trailer and a controller of a vehicle over a wired connection; and
    triggering a notification when the controller has not received a message from the tire pressure management module during at least two key cycles.

2. The method of claim 1, further comprising triggering a notification based on the monitoring when it is detected that the controller has not received a controller area network message from the tire pressure management module during at least the two key cycles.

3. The method of claim 1, wherein the notification is triggered based on at least one message having been received from the tire pressure management module at the controller over a predetermined period of time.

4. The method of claim 1, wherein the connection comprises a tow connector such that the tire pressure management module is powered by the vehicle via the tow connector.

5. The method of claim 4, further comprising:
monitoring the connection between the tire pressure management module and the controller, such that a power status for the module is monitored; and
triggering the notification based on the monitoring when it is detected that the controller has not received a message from the tire pressure management module during at least the two key cycles and that the power status of the tire pressure management module indicates that the module is not powered.

6. The method of claim 5, wherein the notification is triggered when the monitored power status of the tire pressure management module indicated that the module was powered at some point over a predetermined period of time.

7. The method of claim 1, further comprising
muting the notification after the notification has been presented for a minimum amount of time;
continuing to monitor the connection between the tire pressure management module and the controller; and
triggering a second notification based on the continued monitoring when it is detected that the controller has not received a message from the tire pressure management module for at least a predetermined period of time since the muting.

8. A system for monitoring a communicative connection with a trailer, comprising:
a controller mounted to a vehicle, the controller being configured to:
monitor messages transmitted between a tire pressure management module of a trailer and the controller over a wired connection; and
trigger a notification when the controller has not received a message from the tire pressure management module during a predetermined period of time comprising at least two key cycles.

9. The system of claim 8, wherein the controller is further configured to trigger a notification based on the monitoring when it is detected that the controller has not received a controller area network message from the tire pressure management module during the predetermined period of time.

10. The system of claim 8, wherein the notification is triggered based on at least one message having been received from the tire pressure management module at the controller over a second predetermined period of time.

11. The system of claim 8, wherein the connection comprises a tow connector such that the tire pressure management module is powered by the vehicle via the tow connector.

12. The system of claim 11, wherein the controller is further configured to:
monitor the connection between the tire pressure management module and the controller, such that a power status for the module is monitored; and
trigger the notification based on the monitoring when it is detected that the controller has not received a message from the tire pressure management module during the predetermined period of time and that the power status of the tire pressure management module indicates that the module is not powered.

13. The system of claim 12, wherein the notification is triggered when the monitored power status of the tire pressure management module indicated that the module was powered at some point over a second predetermined period of time.

14. The system of claim 8, wherein the controller is further configured to:
mute the notification after the notification has been presented for a minimum amount of time;
continue to monitor the connection between the tire pressure management module and the controller; and
trigger a second notification based on the continued monitoring when it is detected that the controller has not received a message from the tire pressure management module for at least a predetermined period of time since the muting.

15. A method for monitoring a connection with a trailer, comprising:
monitoring messages between a tire pressure management module of a trailer and a controller of a vehicle;
monitoring a connection between the module and controller including a power status for the module; and
triggering a notification when the controller has not received a message from the module during a predetermined period of time and the power status indicates the module is not powered.

16. A system for monitoring a connection with a trailer, comprising:
a controller mounted to a vehicle, the controller being configured to:
monitor messages between a tire pressure management module of a trailer and the controller;
monitor a connection between the module and the controller including a power status for the module; and
trigger a notification when the controller has not received a message from the module during at least a predetermined period of time and when the power status indicates the module is not powered.

17. A method for monitoring a communicative connection with a trailer, comprising:
monitoring messages transmitted between a tire pressure management module of a trailer and a controller of a vehicle;
triggering a notification when the controller has not received a message from the tire pressure management module during a predetermined period of time;
muting the notification after the notification has been presented for a minimum amount of time;
continuing to monitor the connection between the tire pressure management module and the controller; and
triggering a second notification based on the continued monitoring when it is detected that the controller has not received a message from the tire pressure management module for at least a predetermined period of time since the muting.

18. The method of claim 17, further comprising triggering the notification when the controller has not received a controller area network message from the tire pressure management module during at least the predetermined period of time.

19. The method of claim 17, wherein the notification is triggered based on at least one message having been received from the tire pressure management module at the controller over a second predetermined period of time.

20. The method of claim 17, wherein the connection comprises a tow connector such that the tire pressure management module is powered by the vehicle via the tow connector.

* * * * *